No. 706,361. Patented Aug. 5, 1902.
W. THOMSON.
INSTRUMENT FOR MEASURING ELECTRIC CURRENTS.
(Application filed Dec. 30, 1897.)
(No Model.)
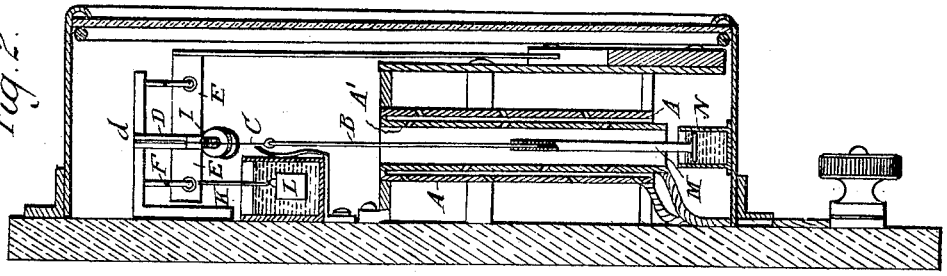
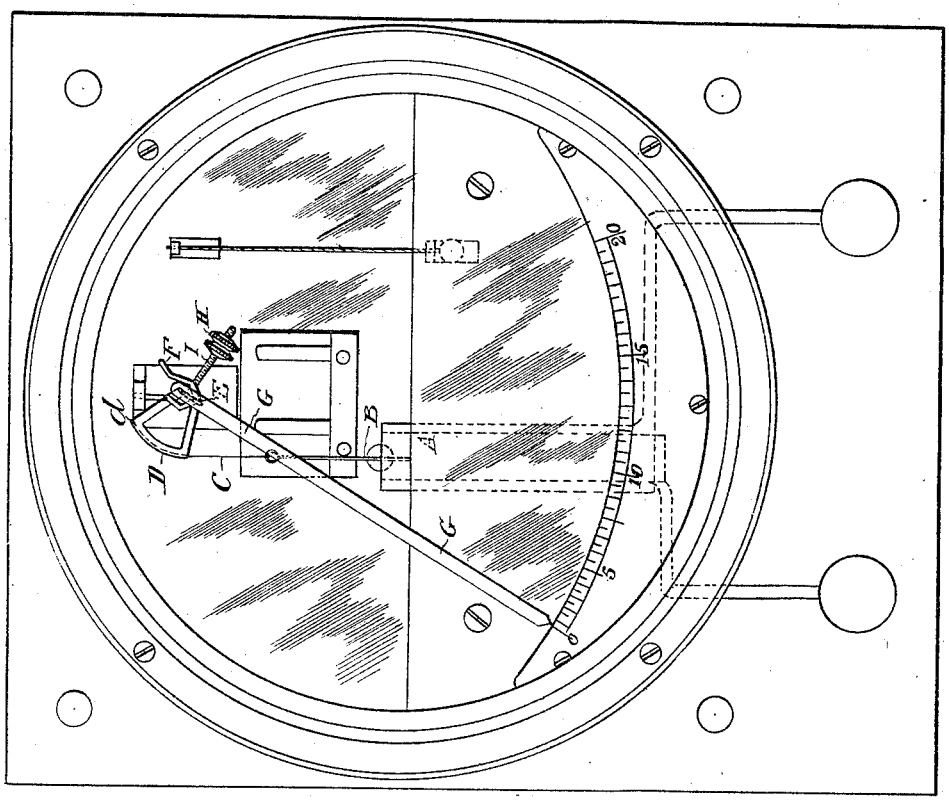
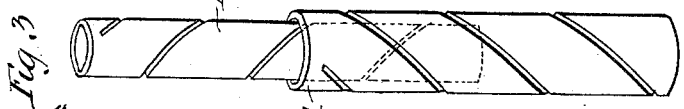
Witnesses:
Herbert Bradley
Edward K. Allen
Inventor
William Thomson
By Knight Bros
Attys.

UNITED STATES PATENT OFFICE.

WILLIAM THOMSON, OF GLASGOW, SCOTLAND.

INSTRUMENT FOR MEASURING ELECTRIC CURRENTS.

SPECIFICATION forming part of Letters Patent No. 706,361, dated August 5, 1902.

Application filed December 30, 1897. Serial No. 664,593. (No model.)

*To all whom it may concern:*

Be it known that I, WILLIAM THOMSON, Baron Kelvin of Largs, professor of natural philosophy in the University of Glasgow, residing at Glasgow, Scotland, have invented Improvements in Instruments for Measuring Electric Currents, (for which I have obtained a patent in Great Britain, No. 4,207, bearing date February 25, 1896,) of which the following is a specification.

The improvement relates to that class of instruments in which a soft-iron rod or wire, which I shall call a "plunger" for brevity, is drawn by electromagnetic force into the vacant core of a bobbin wound around with a conductor carrying the current or into the magnetic field of an equivalent arrangement for producing an intense electromagnetic force in approximately parallel lines.

Instead of modes of suspension hitherto used I hang the plunger by a ligament—such as a flexible cord or chain or wire—from a segment or circular arc fixed to the beam of a balance in such a manner that the ligament passes tangentially downward from this segment or arc. Thus when the beam of the balance turns through an angle, great or small, the plunger moves, as nearly as may be, exactly in the straight line of its own length.

I may use a small length of spiral spring or of india-rubber between the plunger and the bearing-ligament to prevent the ligament from slackening in the event of a sudden starting or stopping of the electric current.
I may also use an air-damper or oil dash-pot to check the vibrations of the balance.

I prefer to make the bearing-ligament of non-conducting material, especially when the instrument is to be used on high-tension circuits. This allows the balance to be kept connected with the earth whatever may be the electric pressure in any part of the solenoid or of its supports.

By means of attached weights or springs applied so as to pull or push upon moving parts of the balance through the whole or through parts of its range I adjust the sensibility of the instrument, so as to give a scale with convenient divisions through the whole range of the currents to be measured.

In the drawings, Figure 1 is a front elevation, and Fig. 2 is a cross-section, of an ampere-gage. Fig. 3 shows the two tubes forming the coil or solenoid.

A A' is the solenoid or coil, into the core of which the soft-iron rod or wire B, forming the so-called "plunger," is drawn by electromagnetic force when the current is passing through the conductor of the solenoid. The iron rod or wire is hung by a ligament, such as a flexible cord or chain or wire C, from a segment or circular arc D. The ligament is fixed at $d$ and passes around the segment or arc D. The segment or arc D is fixed to a beam E, which is supported by two knife-edges, resting in V-shaped recesses formed in the hooks F F. A pointer G is also attached to the beam E, and a scale is provided for reading off the current passing. H is a counterbalance-weight which can be moved along the screwed rod I for adjustment. This screw-threaded rod extends from the beam F at the rear of the segment or arc.

The arrangement described in the drawings gives the scale in a position found convenient for many purposes, especially in respect to compactness of the instrument. In some cases I attach the pointer in other positions—as, for instance, in the line from the middle point of the arc D perpendicular to the axis. This allows the movable part of the balance to be made lighter and allows a heavier soft-iron plunger, giving greater moving power, to be used.

In the drawings two forms of dash-pots are shown, either of which may be used. In one form an arm K is attached to the beam E and carries at its other end a disk L, which moves approximately horizontally in a vessel containing oil or other fluid. In the other form a rod M of non-magnetizable material is attached to the plunger B. This rod M carries a disk N, which moves up and down with the plunger in a pot containing oil or other fluid. The latter form of dash-pot with disk attached to the plunger is dynamically preferable when there is space convenient for it in the instrument.

The vessel containing oil or other liquid may be placed in the core of the solenoid, and the disk may be attached direct to the end of the plunger.

The coil which I use in such instruments is designed so as to give for very strong currents a more uniform field than is attained by ordinary construction.

I take two copper tubes A and A', Fig. 3, one smaller in diameter than the other, and I make one or more spiral cuts in each from near the top to near the bottom, as shown. The spiral cuts in the two tubes are right-handed in one and left-handed in the other. The smaller tube is placed inside the other, with the space between them occupied by air or solid insulating matter. The two tubes are connected together at the top, as shown in Fig. 2. The current goes up the copper spiral of one tube and down the spiral of the other. I thus obtain a very uniform field through almost the whole length of the cylindric space within the coil. I may use four or more tubes cut spirally and connected together, as described, to form the coil. The several pairs may be connected either in series or parallel.

Having now described the nature of my invention, I declare that what I desire to claim by Letters Patent is—

1. The combination of a coil or solenoid; a plunger reciprocating in the coil or solenoid; a beam carrying a pointer, a segment and an adjustable counterbalance-weight; a ligament secured at one end to the segment and at the other end supporting the plunger; a rod attached to the plunger, having a disk; and a vessel for containing fluid in which the disk is immersed to control the movement of the plunger.

2. An instrument for measuring electric currents comprising a coil or solenoid, a plunger reciprocating in the coil or solenoid, hooks having V-shaped recesses, a beam having knife-edges resting in the V-shaped recesses, and carrying a pointer, a segment secured to the beam, a screw-threaded rod secured to the beam, counterbalance-weight adjustable on the screw-threaded rod, and a ligament secured at one end to the segment and at the other end supporting the plunger.

3. An instrument for measuring electric currents, comprising a coil or solenoid, a plunger reciprocating in the coil or solenoid, hooks having V-shaped recesses, a beam having knife-edges resting in the V-shaped recesses, and a pointer connected to the beam.

4. A coil or solenoid for an instrument for measuring electric currents, comprising a tube having a spiral cut.

5. A coil or solenoid for an instrument for measuring electric currents comprising inner and outer tubes having right and left hand spiral cuts respectively.

6. A coil or solenoid for an instrument for measuring electric currents, comprising a number of concentrically-arranged tubes each having a spiral cut.

In testimony whereof I have signed my name to this specification in the presence of two witnesses.

WILLIAM THOMSON.

Witnesses:
JOHN LIDDLE,
EDITH MARY EDMONSTONE.